US012011850B2

(12) United States Patent
Rainey

(10) Patent No.: US 12,011,850 B2
(45) Date of Patent: Jun. 18, 2024

(54) ADJUSTABLE MOLD FOR PRODUCING PRECAST CONCRETE TOP PANELS HAVING VARYING GEOMETRIES FOR USE IN MECHANICALLY STABILIZED EARTH (MSE) RETAINING WALL

(71) Applicant: Earth Wall Products, LLC, Smyrna, GA (US)

(72) Inventor: Thomas Leonard Rainey, Marietta, GA (US)

(73) Assignee: EARTH WALL PRODUCTS, LLC, Smyrna, GA (US)

( * ) Notice: Subject to any disclaimer, the term of this patent is extended or adjusted under 35 U.S.C. 154(b) by 0 days.

(21) Appl. No.: 17/577,908

(22) Filed: Jan. 18, 2022

(65) Prior Publication Data

US 2023/0226718 A1 Jul. 20, 2023

(51) Int. Cl.

*B28B 7/02* (2006.01)
*B28B 1/14* (2006.01)
*E02D 29/02* (2006.01)

(52) U.S. Cl.

CPC .................. *B28B 7/02* (2013.01); *B28B 1/14* (2013.01); *E02D 29/0266* (2013.01); *E02D 2250/0007* (2013.01); *E02D 2250/0023* (2013.01); *E02D 2300/002* (2013.01)

(58) Field of Classification Search

CPC .................................... B28B 7/02; B28B 1/14
See application file for complete search history.

(56) References Cited

U.S. PATENT DOCUMENTS 4,921,204 A * 5/1990 Melfi ........................ B28B 7/02
404/98

* cited by examiner

*Primary Examiner* — Jeffrey M Wollschlager
*Assistant Examiner* — Xue H Liu
(74) *Attorney, Agent, or Firm* — Thomas | Horstemeyer, LLP

(57) ABSTRACT

Various embodiments of an adjustable mold are disclosed for forming a precast concrete top panel for a modular earth retaining wall, for example but not limited to, a modular mechanically stabilized earth (MSE) retaining wall. The adjustable mold has a support base with a top surface, bottom surface, and surrounding periphery. A plurality of rails is mounted to the support base and upstand generally perpendicular from the support base. The rails are collectively attached together to form a closed lateral side boundary with an open top designed to receive liquified concrete. The support base and rails are designed to form sides of the precast concrete top panel. The rails can be adjusted to change a geometric shape associated with the closed lateral boundary in order to enable production of different top panels having different lateral boundaries, and therefore geometries.

11 Claims, 5 Drawing Sheets

ADJUSTABLE MOLD FOR PRODUCING PRECAST CONCRETE TOP PANELS HAVING VARYING GEOMETRIES FOR USE IN MECHANICALLY STABILIZED EARTH (MSE) RETAINING WALL

FIELD OF THE INVENTION

The present invention generally relates to modular earth retaining walls, and more particularly, to an adjustable mold for producing precast concrete top panels, or top units or blocks, having varying geometries for use in a modular earth retaining wall, for example but not limited to, a modular mechanically stabilized earth (MSE) retaining wall.

BACKGROUND OF THE INVENTION

Modular earth retaining walls with concrete panels are commonly used for architectural and site development applications. Such walls are subjected to very high pressures exerted by lateral movements of the soil, temperature and shrinkage effects, and seismic loads.

In many commercial applications, for example, along or support basing highways, etc., each concrete panel can weigh between two and five thousand pounds and have a front elevational size of about eight to ten feet in width by about five feet four inches in height.

Most often, the earth retaining walls of this type are reinforced. A conventional mechanically stabilized earth (MSE) retaining wall with steel or polymer belt reinforconcrete is typically reinforced with steel strips or welded wire meshes that extends backward, or perpendicular, from the rear of a concrete panel to reinforce the backfill soil.

Typically, molds are used to manufacture modular precast concrete panels for the MSE retaining walls. The top panels can be made with varying geometries, i.e., varying angles along the upper portion of the concrete top panel and heights on each side of the top panels to accommodate a final grade or roadway alignment above the MSE retaining wall. The customary production of top panels in the industry today involves custom forming the top panels by manually blocking out a normal or standard rectangular panel mold with wood so that differing angles can be created to follow grade or roadway alignment above and along the top of the MSE retaining wall. This process is undesirably costly, labor intensive, and time consuming, often leads to top panels that are not adequately smooth or inaccurate on the surface(s). Also, to cover up the unsightly wood formed angles, a coping is required to cover up the irregularities.

SUMMARY OF THE INVENTION

The present disclosure provides various embodiments of an adjustable mold for producing precast concrete top panels, or top units, that have varying geometries, or shapes and/or sizes, for use in a modular earth retaining wall, for example but not limited to, a modular mechanically stabilized earth (MSE) retaining wall.

First, one embodiment, among others, is an adjustable precast concrete top panel mold for forming a precast concrete top panel for a modular retaining wall. The mold has a support base with a top surface, bottom surface, and surrounding periphery. A plurality of rails is mounted to the support base and upstand generally perpendicular from the support base. The rails are collectively attached together to form a closed lateral side boundary with an open top designed to receive liquified concrete. The support base and rails are designed to form sides of the precast concrete top panel. The rails can be adjusted to change a geometric shape associated with the closed lateral boundary in order to enable production of different top panels having different lateral boundaries, and therefore different geometries.

Second, another embodiment, among others, is a method for forming a precast concrete top panel for the modular retaining wall. The method can be broadly summarized as follows: providing a mold as defined in the last paragraph; situating the mold so that the bottom surface of the support base is generally horizontal; introducing the liquified concrete into the mold from a generally vertical direction onto the top surface of the support base and against each of the plurality of rails; permitting the concrete to solidify; removing the rails, in whole or in part, in order to remove the top panel; and removing the top panel from the support base.

Third, another embodiment, among others, is an adjustable precast concrete top panel mold for forming a precast concrete top panel for a modular retaining wall. The mold has a generally planar, panel back forming, support base with a top surface, bottom surface, and surrounding periphery, the top surface designed to form a front side of the top panel.

An elongated, panel bottom forming rail with an elongated body extends between opposing ends. The rail extends upwardly in a generally perpendicular manner from the top surface of the panel back forming support base. The elongated body having a bottom concrete contact surface is designed to form a bottom side of the top panel.

An elongated, panel left side forming rail with an elongated body extends between opposing ends. The rail extends upwardly in a generally perpendicular manner from the top surface of the panel back forming, support base. The left side forming rail is extendable and retractable between the first and second ends. The elongated body has a left side concrete contact surface designed to form a left side of the top panel.

An elongated, panel right side forming rail with an elongated body extends between opposing ends. The rail extends upwardly in a generally perpendicular manner from the top surface of the panel back forming support base. The right side forming rail is extendable and retractable between the opposing ends. The elongated body has a right side concrete contact surface designed to form a right side of the top panel. The right and left side concrete contact surfaces are generally parallel.

An elongated, panel top side forming rail with an elongated body extends between opposing ends. The rail extends upwardly in a generally perpendicular manner from the top surface of the panel back forming support base. The top side forming rail is extendable and retractable between the opposing ends. The elongated body has a top side concrete contact surface designed to form a top side of the top panel. The panel top side forming rail is adjustably attached to the panel left side forming rail so that a first angle between the left side and top side concrete contact surfaces can be changed. Moreover, the panel top side forming rail is adjustably attached to the panel right side forming rail so that a second angle between the right side and the top side concrete contact surfaces can be changed.

In this embodiment, a combination of the support base and the rails creates an open top cavity for receiving concrete and for defining a substantial part of an outer shape associated with the precast concrete top panel.

Fourth, another embodiment, among others, is a method for forming a precast concrete top panel for the modular retaining wall. The method can be broadly summarized as follows: providing a mold as defined above; situating the mold so that the bottom surface of the panel back forming support base is generally horizontal; introducing liquified concrete into the mold from a generally vertical direction onto the top surface of the panel back forming support base and against the rails; permitting the concrete to solidify; removing the rails; and removing the top panel from the panel back forming support base.

Fifth, another embodiment, among others, is a mold for forming a precast concrete top panel for a modular retaining wall, the top panel being generally planar with front, back, left, right, top, and bottom sides. The mold has a support base with a top surface, bottom surface, and surrounding periphery. The top surface is designed to form a front side of the precast concrete top panel. The mold further includes an adjustable barrier mechanism for establishing an upstanding, concrete contact barrier on the top surface of the support base. The barrier has lateral sides that are designed to form the left, right, top, and bottom sides of the precast concrete top panel. The barrier has an opening for receiving liquified concrete. The barrier is designed to be separable from the concrete once solidified.

Sixth, another embodiment, among others, is a method for forming a precast concrete top panel for the modular retaining wall. The method can be broadly summarized as follows: providing a mold as defined in the previous paragraph; situating the mold so that the bottom surface of the support base is generally horizontal; introducing liquified concrete into the mold from a generally vertical direction onto the top surface of the panel back forming support base and against the barrier; permitting the concrete to solidify; removing the barrier; and removing the top panel from the support base.

Other embodiments of molds and methods, apparatus, systems, methods, features, and advantages of the present disclosure will be or become apparent to one with skill in the art upon examination of the following drawings and detailed description. It is intended that all such additional embodiments, apparatus, systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF EMBODIMENTS

Figure 1A:
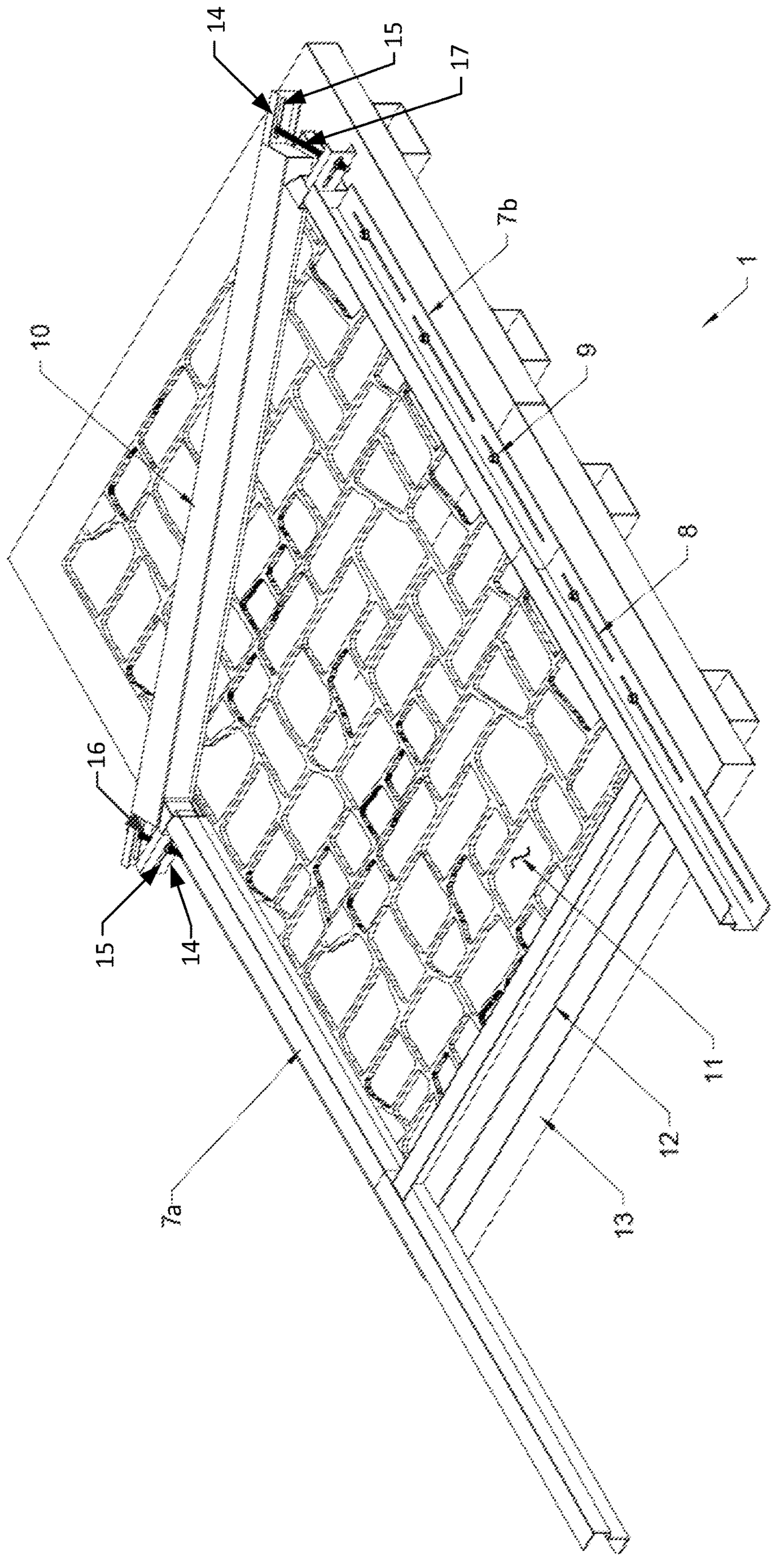
FIG. 1A is a first perspective view of the adjustable mold according to the present disclosure.
Figure 1B:
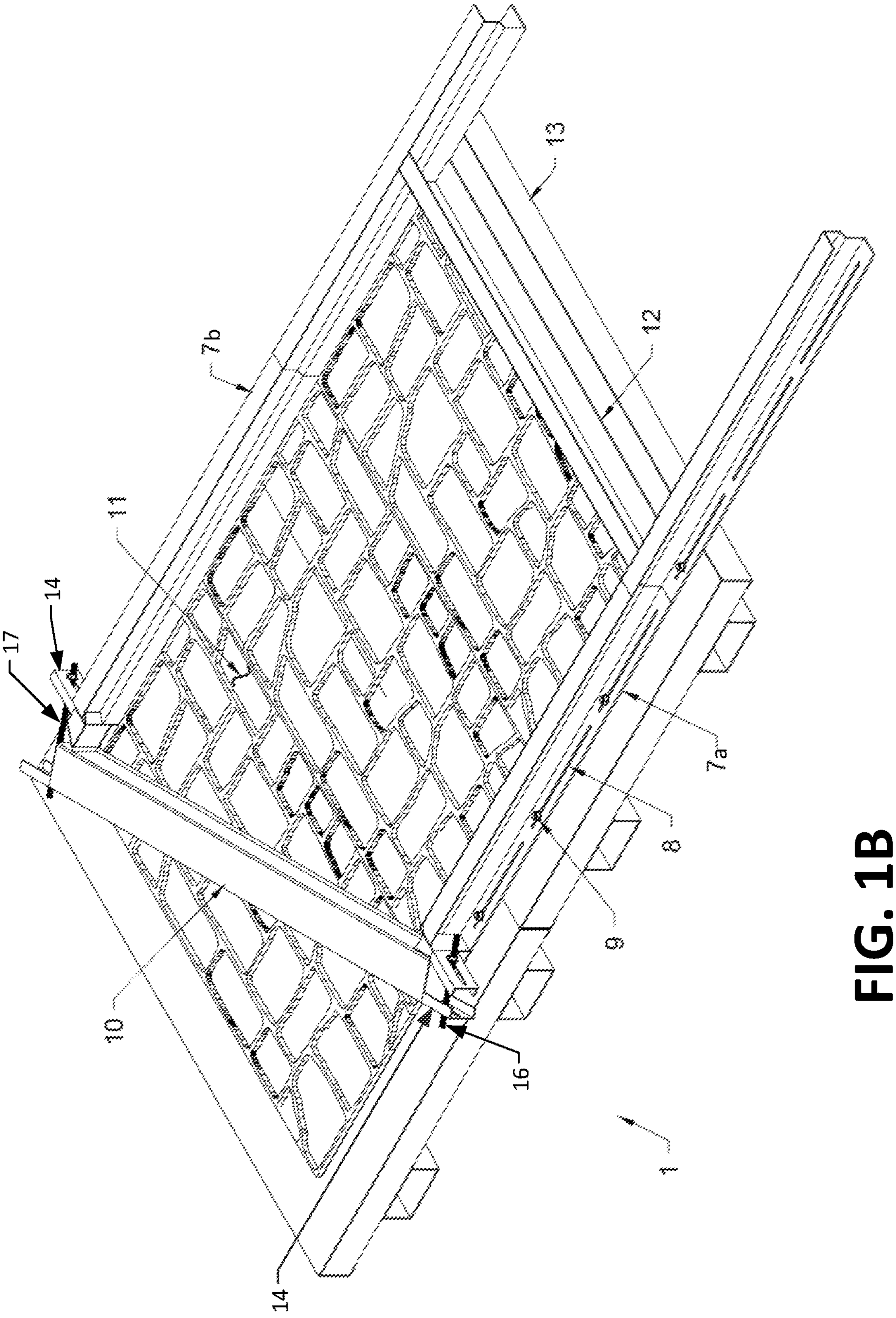
FIG. 1B is a second perspective view of the adjustable mold of FIG. 1A.
Figure 2:
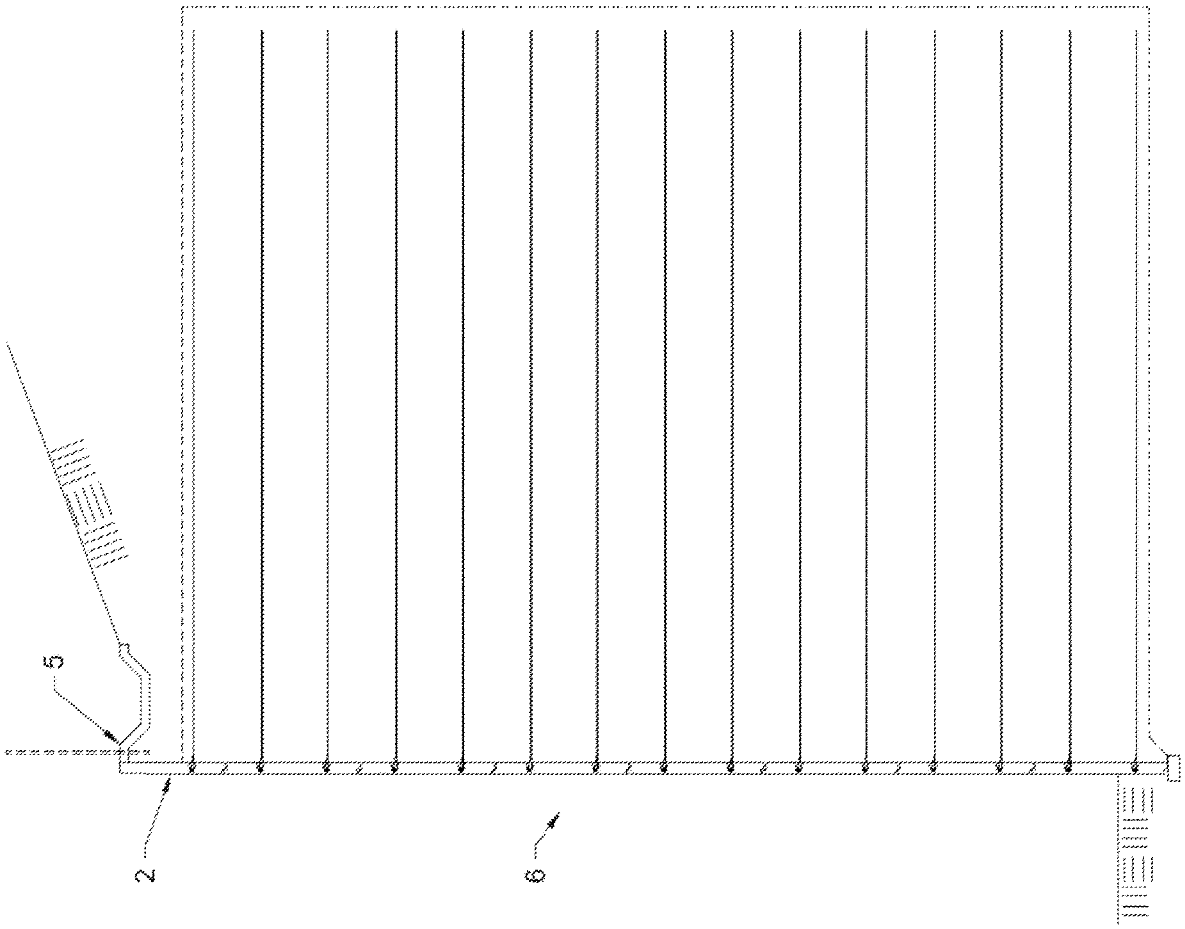
FIG. 2 is a side cross sectional view of a mechanically stabilized earth (MSE) retaining wall that uses the precast concrete top panels having varying geometries.
Figure 4A:
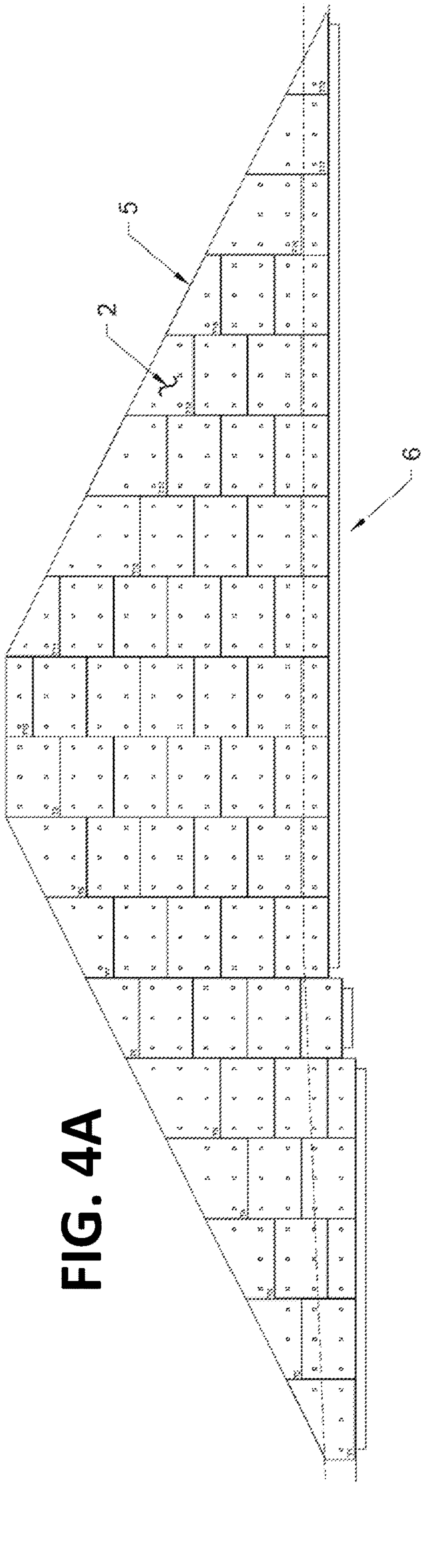
FIG. 4A is a front elevational view of a first example of the MSE retaining wall of FIG. 2, which incorporates the top panel of FIG. 3A.
Figure 4B:
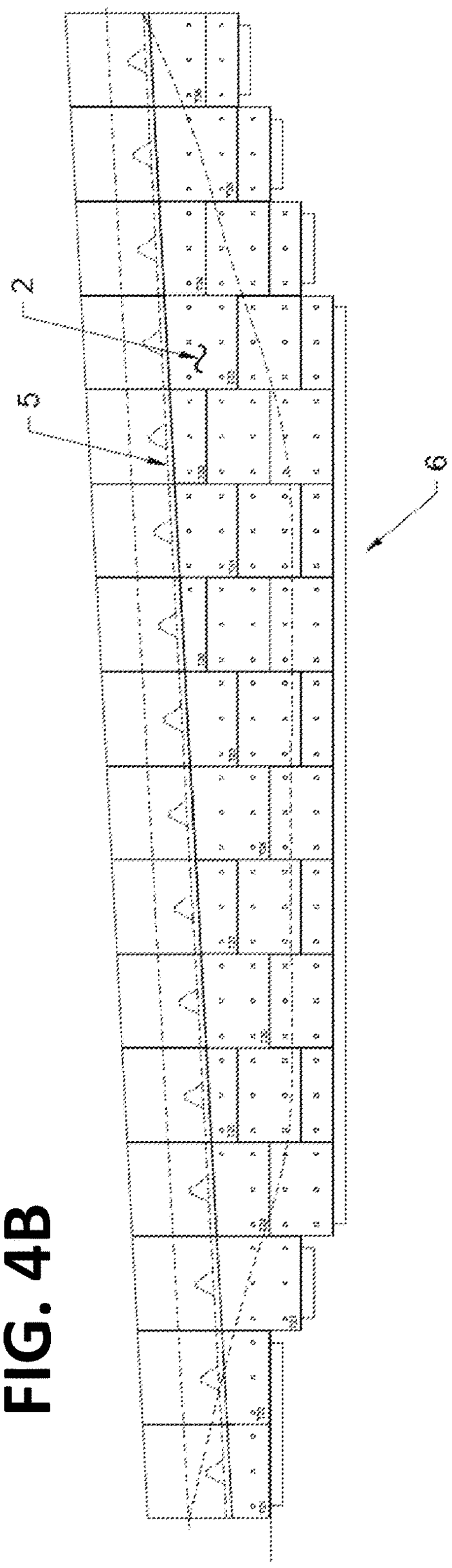
FIG. 4B is a front elevational view of a second example of the MSE retaining wall of FIG. 2, which incorporates the top panel of FIG. 3B.

As shown in FIGS. 1A and 1B, the present disclosure provides an adjustable precast concrete mold 1 that can be used to manufacture precast concrete top panels 2 (top units) with varying geometries, i.e., varying angles 3 along the upper portion of the concrete top panels 2 and varying heights 4 on each side of the panels 2 in order to meet, as shown in FIGS. 2, 4A, and 4B, a final grade 5 or roadway alignment above a modular earth retaining wall 1, for example but not limited to, a modular mechanically stabilized earth (MSE) retaining wall 1.

Figure 3A:
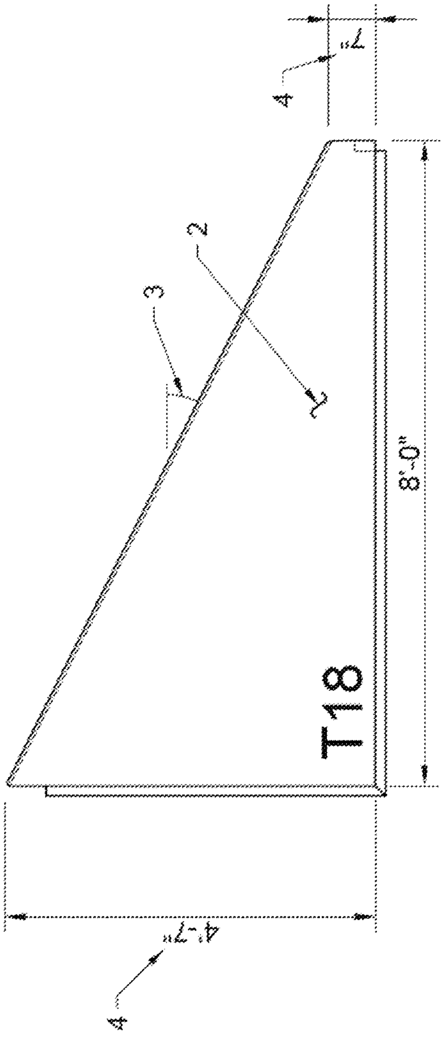
FIG. 3A is a side view of a first example of a top panel utilized in the MSE retaining wall of FIG. 2.
Figure 3B:
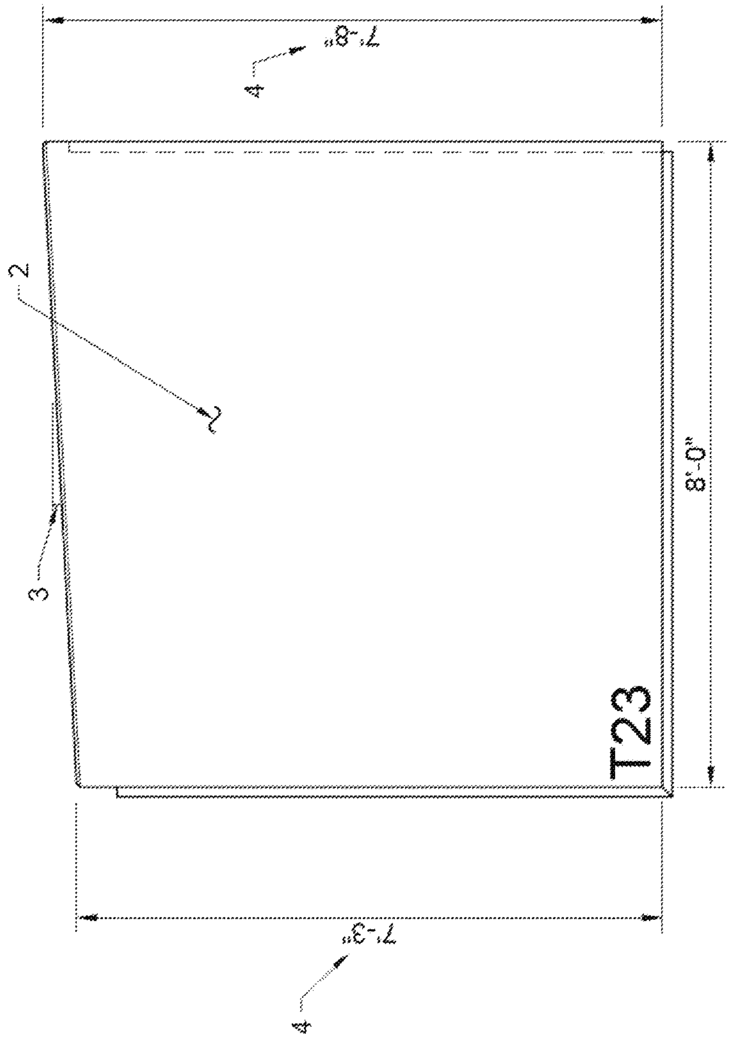
FIG. 3B is a side view of a second example of a top panel utilized in the MSE retaining wall of FIG. 2, which exhibits a much different geometry than the top panel of the first example in FIG. 3A.

To show extreme examples of possible requisite geometries of the top panels 2, a first example of a possible top panel 2 in an MSE retaining wall 6 is illustrated in FIGS. 3A and 4A, and a second example of a possible top panel 2 in an MSE retaining wall 6 is illustrated in FIGS. 3B and 4B. The adjustable mold 1 of the present disclosure prevents the costly and labor-intensive process of having to manually block out and basically custom form each individual top panel 2 during the manufacturing process.

The adjustable mold 1 generally uses a modified conventional precast mold setup that allows elongated, panel left and right side forming rails 7*a*, 7*b* to slide and move up and down at varying distances to allow differing top panel side heights and angles to be created without the undesirable use of wood block outs or custom forming along the top edge. A plurality of elongated slot apertures, 8 enable the rails 7*a*, 7*b* to be attached to the generally planar, support base with flexibility via conventional bolt attachment mechanisms 9 (threaded bolt with suitable nut(s)). Other types of attachment mechanisms are possible. The elongated slot apertures 8 allow different heights on the left and right sides, which results in varying angles along the top portion of the panel 2 to be created.

An elongated, panel top side forming rail 10 is attached to each side rail 7*a*, 7*b*. More specifically, the panel top side forming rail 10 is adjustably attached to the panel left side forming rail 7*a* so that a first angle between the left side and top side concrete contact surfaces can be changed (i.e., between the panel left side forming rail 7*a* and panel top side forming rail 10). The panel top side forming rail 10 is adjustably attached to the panel right side forming rail 7*b* so that a second angle between the right side and the top side concrete contact surfaces can be changed (i.e., between the panel right side forming rail 7*b* and the panel top side forming rail 10). The combination of the underlying support base 13 and the rails 7*a*, 7*b*, 10, 12 creates a cavity with an open top for receiving liquified concrete and for defining an outer shape associated with the precast concrete top panel as the concrete solidifies.

In the preferred embodiment, each of the panel left side forming rail 7*a* and the panel right side forming rail 7*b* and the two opposing ends of the panel top side forming rail 10 have a rectangular, outwardly extending, attachment tab 14 having an elongated slot aperture 15. A first bolt attachment mechanism 16 with a bolt extends through slot apertures 15 of and connecting the panel left side forming rail 7*a* to the panel top side forming rail 10. A second bolt attachment mechanism 17 with a bolt extends through apertures 15 of and connecting the panel right side forming rail 7*b* to the panel top side forming rail 10.

In alternative embodiments, the rails 7*a*, 7*b* can be hingedly attached to the rail 10 via suitable hinges (not shown) in order to enable the required adjustment and movement of the rails 7*a*, 7*b*, and 10.

The side rails 7*a*, 7*b* and top rail 10 are movable on top of an underlying liner 11. The liner 11 is an optional feature. In the preferred embodiment, the liner 11 is made of rubber. The rubber liner 11 is used inside the top panel mold 1 on top of the generally planar support base 13 in order to create a surface texture, e.g., an impression of stone, brick, block, fractured fin, or whatever aesthetics the owner or architect desires. A bottom rail 12 is attached to the panel back forming, support base 13 and/or to the rails 7*a*, 7*b*, which allows the liner 11 to be aligned with the top panel 2 below and adjacent to the top panel 2 being truncated at the top at varying angles and heights.

In the preferred embodiment, the periphery of the support base 13 extends in a planar direction beyond the top rail 10 so that many differences in the angles 3 and heights 4 can be accomplished while enabling the support base 13 to entirely cover and extend between the panel bottom side forming rail 12 and the panel top side forming rail 10.

In order to use and operate the adjustable mold 1 for forming a precast concrete top panel 2 (FIG. 2) for the modular retaining wall 6 (FIG. 2), the following steps are performed. The mold is situated so that the bottom surface of the panel back forming support base 13 is generally horizontal. Liquified concrete is introduced into the mold from a generally vertical direction onto the top surface of the panel back forming support base 13 or the liner supported by the base 13 and against the rails. The concrete is permitted to solidify in order to create the finished top panel 2. The flat back side of the top panel 2 is not formed with a concrete barrier, but instead is formed as a generally planar surface by placoncrete of the support base 13 in a generally horizontal position relative to and with the force of gravity. The rails 7*a*, 7*b*, 10, 12 are next removed. The finished top panel 2 can then be removed from the panel back forming support base 13. The finished top panel 2 can now be employed in the MSE retaining wall 6 of FIGS. 2, 4A, and/or 4B.

In the preferred embodiment, the rails 7*a*, 7*b*, 10, 12 and support base 13 are made of steel, but could be made of other suitable materials provided that there is sufficient rigidity for serving as a concrete forming barrier. Moreover, the liner 11 is made of rubber to enable application of texturing, but use of other suitable materials is also possible.

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

At least the following is claimed:

1. An adjustable precast concrete top panel mold for forming a precast concrete top panel for a modular earth retaining wall, comprising:

a planar, panel back forming, support base with a top surface, bottom surface, and surrounding periphery, the top surface designed to form a front side of the top panel;

an elongated, panel bottom forming rail with an elongated body extending between opposing ends, the rail extending upwardly in a perpendicular manner from the top surface of the panel back forming support base, the elongated body having a bottom concrete contact surface designed to form a bottom side of the top panel;

an elongated, panel left side forming rail with an elongated body extending between opposing ends, the rail extending upwardly in a perpendicular manner from the top surface of the panel back forming, support base, the left side forming rail being extendable and retractable between the first and second ends, the elongated body having a left side concrete contact surface designed to form a left side of the top panel;

an elongated, panel right side forming rail with an elongated body extending between opposing ends, the rail extending upwardly in a perpendicular manner from the top surface of the panel back forming support base, the right side forming rail being extendable and retractable between the opposing ends, the elongated body having a right side concrete contact surface designed to form a right side of the top panel, the right and left side concrete contact surfaces being parallel;

an elongated, panel top side forming rail with an elongated body extending between opposing ends, the rail extending upwardly in a perpendicular manner from the top surface of the panel back forming support base, the top side forming rail being extendable and retractable between the opposing ends, the elongated body having a top side concrete contact surface designed to form a top side of the top panel, the panel top side forming rail being adjustably attached to the panel left side forming rail so that a first angle between the left side and top side concrete contact surfaces can be changed, the panel top side forming rail being adjustably attached to the panel right side forming rail so that a second angle between the right side and the top side concrete contact surfaces can be changed; and wherein a combination of the support base and the rails creates an open top cavity for receiving concrete and for defining a substantial part of an outer shape associated with the precast concrete top panel.

2. The mold of claim 1, further comprising a liner having a top surface and a bottom surface, the bottom surface situated on the support base, the top surface having a texture that is imposed on concrete introduced into the mold.

3. The mold of claim 1, wherein the periphery of the back panel forming support base extends in a planar direction beyond the panel top side forming rail so that differences in the angles can be accomplished while enabling the panel back forming support base to entirely cover and extend between the panel bottom forming rail and the panel top side forming rail.

4. The mold of claim 1, wherein each of the panel left and right side forming rails and the opposing ends of the panel top side forming rail further comprises an outwardly extending attachment tab having an elongated aperture, and further comprising a first bolt attachment mechanism with a first bolt extending through apertures of and connecting the panel left side forming rail to the panel top side forming rail, and further comprising a second bolt attachment mechanism with a second bolt extending through apertures of and connecting the panel right side forming rail to the panel top side forming rail.

5. The mold of claim 4, wherein the panel left and right side forming rails each have a plurality of elongated apertures and further comprising left and right side bolt attachment mechanisms, each bolt attachment mechanism having a bolt extending through a respective aperture that secures a respective rail to the panel back forming support base and enables the respective rail to be laterally moved along the top surface of the panel back forming support base.

6. The mold of claim 1, wherein the top panel is planar with front, back, left, right, top, and bottom sides and wherein the substantial part comprises the front, left, right, top, and bottom sides of the top panel.

7. A method for forming the precast concrete top panel for the modular retaining wall, comprising the steps of:

providing a mold as defined in claim 1;

situating the mold so that the bottom surface of the panel back forming support base is horizontal;

introducing liquified concrete into the mold from a vertical direction onto the top surface of the panel back forming support base and against the rails;

permitting the concrete to solidify;

removing the rails; and removing the top panel from the panel back forming support base.

8. A mold for forming a precast concrete top panel for a modular earth retaining wall, the top panel having a plurality of sides, the mold comprising:

a support base with a top surface, bottom surface, and surrounding periphery, the top surface designed to form a side of the precast concrete top panel;

a plurality of rails that upstand perpendicular from the support base, the rails attached to form a closed lateral boundary with an open top to receive liquified concrete, the rails designed to form lateral sides of the precast concrete top panel;

wherein the plurality of rails can be adjusted to change a geometric shape associated with the closed lateral boundary in order to enable production of different top panels having different lateral boundaries; and wherein the plurality of rails further comprises:

an elongated, panel bottom forming rail with an elongated body extending between opposing ends, the rail extending upwardly in a perpendicular manner from the top surface of the panel back forming support base, the elongated body having a bottom concrete contact surface designed to form a bottom side of the top panel;

an elongated, panel left side forming rail with an elongated body extending between opposing ends, the rail extending upwardly in a perpendicular manner from the top surface of the panel back forming, support base, the left side forming rail being extendable and retractable between the first and second ends, the elongated body having a left side concrete contact surface designed to form a left side of the top panel;

an elongated, panel right side forming rail with an elongated body extending between opposing ends, the rail extending upwardly in a perpendicular manner from the top surface of the panel back forming support base, the right side forming rail being extendable and retractable between the opposing ends, the elongated body having a right side concrete contact surface designed to form a right side of the top panel, the right and left side concrete contact surfaces being generally parallel; and an elongated, panel top side forming rail with an elongated body extending between opposing ends, the rail extending upwardly in a perpendicular manner from the top surface of the panel back forming support base, the top side forming rail being extendable and retractable between the opposing ends, the elongated body having a top side concrete contact surface designed to form a top side of the top panel, the panel top side forming rail being adjustably attached to the panel left side forming rail so that a first angle between the left side and top side concrete contact surfaces can be changed, the panel top side forming rail being adjustably attached to the panel right side forming rail so that a second angle between the right side and the top side concrete contact surfaces can be changed.

9. The mold of claim 8, wherein each of the panel left and right side forming rails and the opposing ends of the panel top side forming rail further comprises an outwardly extending attachment tab having an elongated aperture, and further comprising a first bolt attachment mechanism with a first bolt extending through apertures of and connecting the panel left side forming rail to the panel top side forming rail, and further comprising a second bolt attachment mechanism with a second bolt extending through apertures of and connecting the panel right side forming rail to the panel top side forming rail.

10. The mold of claim 9, wherein the panel left and right side forming rails each have a plurality of elongated apertures and further comprising left and right side bolt attachment mechanisms, each bolt attachment mechanism having a bolt extending through a respective aperture that secures a respective rail to the panel back forming support base and enables the respective rail to be laterally moved along the top surface of the panel back forming support base.

11. A method for forming the precast concrete top panel for the modular retaining wall, comprising the steps of:

providing a mold as defined in claim 8;

situating the mold so that the bottom surface of the support base is horizontal;

introducing the liquified concrete into the mold from a vertical direction onto the top surface of the support base and against each of the plurality of rails;

permitting the concrete to solidify;

removing the rails, in whole or in part, in order to remove the top panel; and removing the top panel from the support base.

* * * * *